US006721640B2

(12) United States Patent
Glenn et al.

(10) Patent No.: US 6,721,640 B2
(45) Date of Patent: Apr. 13, 2004

(54) EVENT BASED AIRCRAFT IMAGE AND DATA RECORDING SYSTEM

(75) Inventors: Matthew H. Glenn, North Bend, WA (US); Mike Zelin, Chandler, AZ (US); Wendell A. Frost, Renton, WA (US)

(73) Assignee: Honeywell International Inc., Morristown, NJ (US)

( * ) Notice: Subject to any disclaimer, the term of this patent is extended or adjusted under 35 U.S.C. 154(b) by 205 days.

(21) Appl. No.: 09/768,659

(22) Filed: Jan. 23, 2001

(65) Prior Publication Data

US 2002/0004695 A1 Jan. 10, 2002

Related U.S. Application Data

(60) Provisional application No. 60/180,474, filed on Feb. 3, 2000.

(51) Int. Cl.[7] .......... G01M 17/00

(52) U.S. Cl. .......... 701/35; 701/29; 340/945

(58) Field of Search .......... 701/35, 14, 29, 701/3, 8, 9, 10; 340/945, 963; 348/211.14, 65, 117, 151, 159

(56) References Cited

U.S. PATENT DOCUMENTS

| | | | | |
|---|---|---|---|---|
| 4,816,828 A | | 3/1989 | Feher | 340/945 |
| 5,144,661 A | | 9/1992 | Shamosh et al. | 348/143 |
| 5,283,643 A | | 2/1994 | Fujimoto | 348/143 |
| 5,428,530 A | | 6/1995 | Brown et al. | 703/8 |
| 5,742,336 A | | 4/1998 | Lee | 348/144 |
| 5,761,625 A | * | 6/1998 | Honcik et al. | 701/14 |
| 5,798,458 A | | 8/1998 | Monroe | 73/587 |
| 5,890,079 A | | 3/1999 | Levine | 701/14 |
| 5,974,349 A | | 10/1999 | Levine | 701/29 |
| 6,009,356 A | | 12/1999 | Monroe | 701/14 |
| 6,092,008 A | * | 7/2000 | Bateman | 701/14 |
| 6,577,339 B1 | * | 6/2003 | Thompson et al. | 348/211.14 |

OTHER PUBLICATIONS

National Transportation Safety Board, Safety Recommendation, Feb. 8, 2000.

*Fundamental Needs for On–Board Image Recording*, Eurocae WG50, Sub Group 3 Agreed Final Draft (Sep. 27th, 2000).

* cited by examiner

*Primary Examiner*—Marthe Y. Marc-Coleman
(74) *Attorney, Agent, or Firm*—Honeywell Int'l Inc.

(57) ABSTRACT

An apparatus and method for recording image data of flight parameters and events includes a reconfigurable set of instructions for determining when such data will be retained in flight recorder memory.

14 Claims, 4 Drawing Sheets

EVENT BASED AIRCRAFT IMAGE AND DATA RECORDING SYSTEM

CROSS-REFERENCES TO RELATED APPLICATIONS

This application is related to and claims priority from copending U.S. Application Ser. No. 60/180,474 titled "Event Based Cockpit Image and Data Recording System," filed Feb. 3, 2000 and incorporated herein by reference in its entirety.

BACKGROUND OF THE INVENTION

The present invention relates generally to aircraft flight data collection and more particularly to collection of data useful in accident and incident investigations.

Many commercial and some military aircraft carry flight data recorders (FDRs) and cockpit voice recorders (CVRs). The flight data recorder receives encoded data from a variety of onboard sensors that monitor aircraft performance and stores this data in a form that may be retrieved later. The cockpit voice recorder records verbal exchanges between the crew and ground controllers as well as ambient cockpit noise.

The FDR and CVR, also known colloquially as "black boxes," have played a significant role in determining the particular cause of aircraft accidents and providing data to assist in the prevention of similar accidents. The FDR and CVR normally comprise a recording medium housed in a crash survivable enclosure. The recording medium may be magnetic tape, optical disc, or in most modern aircraft, a semiconductor memory device. The data stored on these devices enables investigators to reconstruct the last minutes of flight, the events leading to the accident and the responses made by the crew.

As critical as the information recorded on the flight data recorders and flight data recorders is to accident investigation, these devices still may not capture all the data useful for analyzing an accident scenario. Vital information regarding the cockpit environment, non-verbal crew communications, crew workload, instrument display selections and status has not been available on traditional data and voice recorders. This limitation has curbed the scope of many investigations, but more importantly, has hindered the identification of safety issues and consequently the corrective action needed to prevent future occurrences. In several high profile accident investigations, despite the availability of state of the art flight data and cockpit voice recorder systems, the official findings of the investigation have generated considerable controversial debate reducing the time and energy that could have been better used on safety improvements.

For example, the position of certain cockpit switches, or the reading on certain cockpit gauges, may not always be determined with certainty because the particular switch/gauge position is not a parameter recorded by the FDR. Thus, accident investigators are forced to reconstruct the cockpit instrumentation from the accident wreckage to determine the switch/gauge position at the time of the accident. However, this method leads to uncertainty since the force of the accident impact could itself be responsible for positioning the gauge or switch in the recovered position. Alternatively, accident investigators analyze the ambient noises and crew communications recorded on the CVR for any audible indications that a particular switch was set or gauge reading announced.

The above example is but one example of the many types of data that investigators must infer from the recovered recorded data. Simply adding more instrumentation and recording additional parameters is not a practical option. Anticipating which of the multitude of parameters not already recorded will be relevant to an accident scenario cannot be done in advance. In addition, data recorders, of whatever type, will always have some finite capacity, thereby necessitating choices in what parameters to record.

One solution proposed is to strategically position video cameras throughout the aircraft to obtain visual images of the aircraft and crew operations during flight. U.S. Pat. Nos. 6,009,356; 5,974,349; 5,890,079; 5,742,336 and 4,816,828 each disclose an aircraft safety system that includes video cameras for monitoring aircraft operations. Video cameras have the advantage of providing a visual record of events and eliminate the need to reconstruct those events from other indirect evidence. However, the presence of video cameras aboard the aircraft raises privacy concerns among flight professionals and the flying public. Since these systems continuously record data, pilots' and flight attendants' unions and passenger activist groups have been reluctant to accept the presence of video cameras onboard the aircraft. Thus, the safety advantages possible from analyzing video data have not yet been realized.

In addition, video data consumes a significant quantity of bandwidth, or system storage memory. Continuously recording all video data onto a FDR or CVR memory device is simply not practicable. In part for this reason, the systems described in the aforementioned US Patents also downlink continuous video data via satellite telemetry systems to remote ground stations for storage. Such systems raise additional privacy concerns since, unlike the onboard storage systems which are overwritten, the ground based storage architecture enables archiving of information. Furthermore, the downlinking and transmission of data from the aircraft is an expensive process which adds significantly to the cost of aircraft operations.

SUMMARY OF THE INVENTION

The present invention recognizes the safety advantages possible through use of aircraft video image data. The present invention additionally recognizes and solves the privacy, capacity and cost issues not recognized or solved by prior art systems incorporating video data. The present invention augments existing flight and voice data by capturing images of the flight deck and other aircraft locations to better understand the cockpit environment, flight crew interactions and the overall human/machine interface. The present invention also enables the capture of information that is otherwise impractical to explicitly record on the FDR and/or CVR.

According to one aspect of the present invention, an event based video image recording system is used to collect video data. Various parameters may be pre-identified to determine when activation of the video data recording system occurs. Upon occurrence of one or more of these predetermined parameters, the video data recording system activates and stores the video data in an FDR, CVR or other memory device. Optionally, once the system is activated, the video data may be downlinked using the aircraft onboard ACARS system or other telemetry device.

According to another aspect of the present invention, video cameras are placed at strategic locations throughout the aircraft where video information is likely to prove of use in analyzing crash or incident events. Such locations may include for example: the aircraft cockpit, the cargo holds and passenger cabins. Locations may also include locations on the exterior of the aircraft.

According to yet another aspect of the present invention, the predefined criteria for activating video recordings at individual ones of the many strategic locations may be different for each of the locations. Furthermore, the criteria may be user defined, using for example, a reconfigurable algorithmic network that may be used to logically associate various data parameters with data gathering/recording activities to be performed.

Further aspects and advantages of the present invention will be described in greater detail below.

DESCRIPTION OF THE PREFERRED EMBODIMENTS

Figure 1:
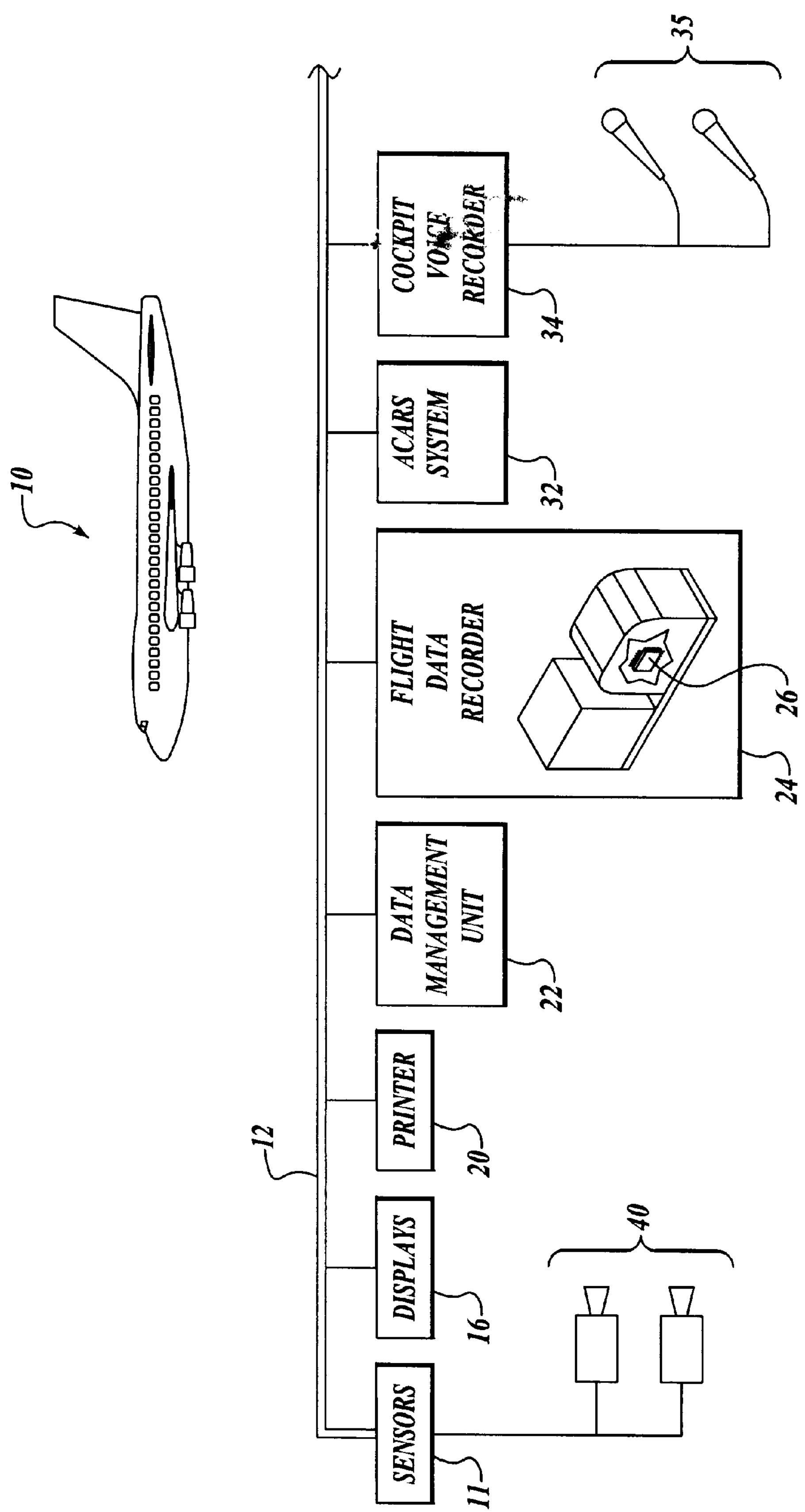
FIG. 1 is a diagram of an aircraft data management system according to a preferred embodiment of the invention.

FIG. 1 contains a diagram of an aircraft data management system for use with the present invention. In the diagram of FIG. 1, aircraft 10 includes a multitude of sensors 11, which sense flight data and parameters such as, for example, airspeed, altitude, rudder position, and aircraft acceleration data. In a typical modem aircraft, the data management system gathers and records over 240 different aircraft parameters. Aircraft 10 also includes one or more digital data busses 12. Digital data bus(s) 12 transfers information in digital form between various systems and equipment aboard aircraft 10, including that data obtained by sensors 11. Other types of equipment coupled to data bus(s) 12 may include cockpit displays 16, flight control systems (not shown), and a printer 20 for providing the crew with printed reports and other communications. The present invention is not dependent upon the particular form of digital data buss 12, and the present invention can be made operable with, for example, the ARINC 429 or Honeywell Safebus™ buss architectures used on many commercial airliners.

The system of FIG. 1 further includes a flight data acquisition management unit 22, sometimes called a "FDAMS." The abbreviation "FDAMS" is sometimes used in this specification without intending to reference or limit the invention to a particular type of data acquisition unit. Regardless of the particular name by which it is called, according to the present invention, a data acquisition management unit 22, retrieves digital data from digital data bus(s) 12 and formats it into a form for recordation by a flight data recorder 24. In a preferred embodiment of the invention, flight data recorder 24 includes a solid state digital memory device 26 for storing the recorded flight parameters. Flight data recorder 24 may be additionally equipped with various transfer media such as an optical disc, a PCMCIA card or floppy disc for downloading data stored in the flight data recorder memory device. Flight data recorder 24 memory 26 may also be directly accessed via a port which can connect to a portable reader device or personal computer.

The system of FIG. 1 may also optionally include an ARINC Communications Addressing and Reporting System 32, or ACARS. ACARS 32 may be used for telemetry of data and messages between the aircraft and ground stations. In most systems, data to be transmitted from the aircraft is formatted for transmission and sent to ACARS 32 from FDAMS 22 via digital bus(s) 12.

A cockpit voice recorder 34 is additionally included in the system of FIG. 1. Cockpit voice recorder 34 is coupled to microphones 35 placed at predetermined locations throughout the cockpit and records those conversations and noise captured by these microphones. Cockpit voice recorder 34 may employ any number of recording media; however, in a preferred embodiment of the invention, cockpit voice recorder 34 includes a digital semiconductor memory device. Cockpit voice recorder 34 may receive the microphone 35 signal via a local bus and convert the audio signal to a format suitable for storage in recorder 34. Optionally, the audio signal may be converted downstream to digital form, and formatted by FDAMS 22 for storage in a data recording device coupled to FDAMS 22.

According to an embodiment of the present invention, the data management system of FIG. 1 additionally includes a plurality of video recording devices 40 located in and throughout aircraft 10. Video recording devices 40 may be an analog video camera in which the analog video stream is converted into digital format using an analog to digital converter according to techniques well known to those of skill in the art. Video recording devices 40 may also be CCD cameras or other digital imaging type cameras. Optionally, video recording devices 40 may comprise infrared cameras. The infrared camera is particularly useful, for example, for discerning personnel movements; or points with elevated temperature; in fire, smoke or other obscured vision situations. Infrared data could therefore be particularly useful in observing cockpit and cabin crew movements through smoke when their movements would otherwise be obscured. Infrared data would also prove valuable in identifying equipment or other objects with elevated temperatures that may indicate the source or flash point of a fire. As used in this patent application, therefore, the terms "video" and "image" data include camera data in either the visual or infrared spectrums.

Video cameras 40 may be located in the cockpit, passenger cabin area, cargo holds, aircraft exterior and/or at any other location likely to produce video information of value to investigators or for improved operations. When located in the cockpit, video camera(s) 40 can be positioned and outfitted with appropriate lenses to view crew movements, display indications and/or control switch positions. Preferably the video image captures all flight crew station work areas including instruments and controls, forward instrument panel, overhead panel, center pedestal and video displays presented to the crew (where installed). For instance, a camera 40 may be located behind and above the cockpit crew to observe the instrument panel and controls in front of the flight crew. A second video camera 40 may be located overhead in the cockpit to observe the flight deck crew. To respect crew privacy, cockpit area views are preferably designed to exclude the head and shoulders of crew members whilst seated in their normal operating positions.

Cockpit video camera(s) 40 may further include an audio function. This audio function may be in addition to the preexisting microphone set up used for cockpit voice recording in accordance with current FAA regulations. Alternatively, the audio function may be used in lieu of a separate microphone system for this purpose. This architecture reduces aircraft weight and cost by avoiding a redundant microphone set up and associated wiring. In such a configuration, the audio data would be continuously recorded to satisfy current regulations.

When located in the cabin, video camera(s) 40 may be positioned to observe, for example, emergency exits, galley areas or a wide angle view of the entire cabin. Such video data would be potentially useful in analyzing passenger egress after an incident or accident, cabin fires, crew performance during an incident and/or terrorist and other criminal activities. Camera(s) 40 located in the cabin may also optionally include an audio function for recording the conversations and sounds occurring in the cabin.

When located in the cargo hold, or aircraft equipment bays, camera(s) 40 could be positioned to view the hold interior and its contents and would be especially useful in identifying the origin of a fire and/or other equipment malfunctions. Camera(s) 40 in the cargo hold may also optionally be equipped with an audio circuit. The audio circuit associated with camera 40 of the cargo hold is potentially useful for detecting the origin and propagation of an in-flight explosion and/or for acoustic noise associated with the in-flight breakup of an aircraft. By noting the relative time and decibel level of the acoustic noise recorded by the aircraft's compliment of audio sensors, investigators are able to determine the physical point of origin and propagation of an in-flight explosion, breakup or other malfunction with an acoustic signature.

When located on the exterior of the aircraft, camera(s) 40 may be positioned to observe control surface operation, passenger exits, landing gear operation, and the view ahead of the aircraft. When located on the exterior of the aircraft, camera(s) 40 are placed such that they do not interfere with aircraft control surface operation and may be housed in a protective housing having an aerodynamic shape. The lens or viewing aperture of exterior camera(s) 40 is protected from damage by a transparent film or protective cover. Possible locations for exterior cameras include the leading and trailing edges of the wing ends or interior wing structure and having a field of view(s) on the wing control surfaces, engine nacelles, forward looking view and/or an aft view of the aircraft. Housing the camera within the wing structure protects the camera from the environment and also prevents the camera from interfering with the wing aerodynamics. Another possible mounting location for exterior camera(s) 40 is the leading edge of the horizontal tail and the top, leading edge of the vertical tail. The specific location of the camera within the wing and tail surfaces will vary as a function of aircraft design and construction. Exterior camera (s) 40 may also include an audio sensor to capture those events and malfunctions having an acoustic signature. Ambient noise caused by the normal motion of the plane through the air can be reduced by using a filter to remove this portion of the audio signal. Construction of such filters is well known to those of ordinary skill in the art.

For video cameras 40 operating in the visual spectrum, sufficient light must be available to record an image. For cockpit and cabin locations, these areas are usually sufficiently illuminated with the existing aircraft lighting. For cargo hold and exterior locations filmed at night a low light level camera may be used or an illumination source can be provided. Such illumination sources are known and may be collocated with the camera or located remote from the camera to illuminate the area of interest. For exterior portions of the aircraft, the wing and tail sections typically include special lighting for illuminating the aircarrier logo and aircraft identification during taxi and night flight. Camera(s) 40 can be positioned to make use of this preexisting source of illumination.

Figure 2:
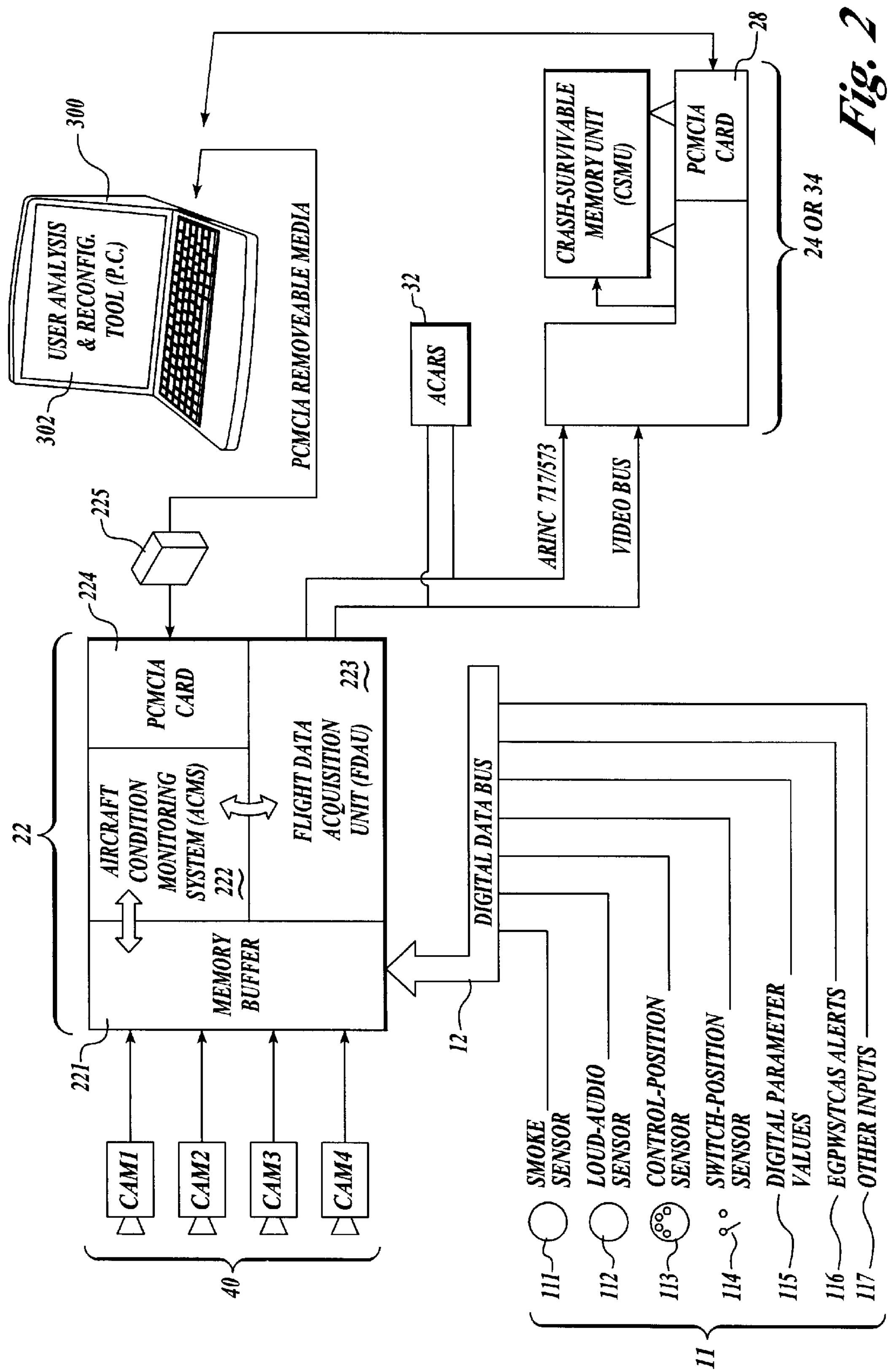
FIG. 2 is a block diagram of an event based image recording system according to a preferred embodiment of the present invention.

FIG. 2 contains a block diagram of an event based image recording system utilizing the system described in FIG. 1 according to one embodiment of the present invention. In the embodiment of FIG. 2, the output of camera(s) 40 located throughout aircraft 10 is transmitted to FDAMS unit 22. The output of camera(s) 40 may be sent to FDAMS 22 via digital data bus 12, a secondary digital data bus or via wireless transmission.

FDAMS 22 also receives the output of sensors 11 via data bus 12. Sensors 11 may include a smoke sensor 111, a loud audio sensor 112, various control surface position sensors 113, switch position sensors 114, miscellaneous digital parameter values 115 such as acceleration and gyro data, terrain proximity warning system or traffic collision avoidance system alerts 116 as well as numerous other inputs 117. On modern aircraft, the number of parameters monitored by sensors 11 are often in excess of 20,000 of which over 240 may be recorded by the flight data recorder at any one time interval.

Data received from cameras 40 and sensors 11 is initially retained in memory buffer 221 of FDAMS 22. An aircraft condition monitoring system 222, or ACMS, can be configured according to one embodiment of the present invention to control what data and what sequencing of the data held in memory buffer 221 is to be formatted by flight data acquisition unit, FDAU, 223. Flight data acquisition unit 223 time stamps and places the data received from sensors 11 and cameras 40 into a form for recordation by flight data recorder 24. According to one embodiment of the invention, video camera data 40 may also be formatted for transmission by ACARS 32 or a similar telemetry device.

According to the present invention, if and when video data is recorded, is an event-based configurable parameter. In one embodiment of the invention, FDAMS 22 includes a PCMCIA card slot 224 through which the recording instructions are received. For example, instructions contained on PCMCIA card 225 can direct FDAMS 22 to store video data received from the cargo hold when a smoke detector sensor 111 activates in that hold. Other methods for providing instructions to FDAMS 22 known to those of skill in the art may be used and the invention is not limited to the use of a PCMCIA card for storing/transfer of instructions. For example, the instruction set may be stored in firm ware, transmitted via ACARS unit 32 or transferred via other input output devices known to those of skill in the art. The instruction set provided to FDAMS 22 may indicate one or more set of events per camera 40 under which that camera's data will be recorded. The instruction set may also include direct transmission of the video data via telemetry or ACARS 32 when certain predefined conditions are met.

In a preferred embodiment of the invention, the instruction set contained on PCMCIA card 225 is written to the card by a remote user using a reconfiguration tool in the form of a personal computer 300. User configuration tool 300 may further be used to interface with and download data from recording device 24 or 34. According to the preferred embodiment of the invention, the instruction set for controlling when video data from cameras 40 is recorded comprises a reconfigurable algorithmic network (RAN). The RAN defines a set of operations to be performed on selected flight data obtained from cameras 40 and sensors 11 and to format reports that will either display and/or cause to be recorded the results of the operations on the data. In the current application, the RAN is useful for defining when and under what conditions data from camera(s) 40 are to be recorded.

Figure 3:
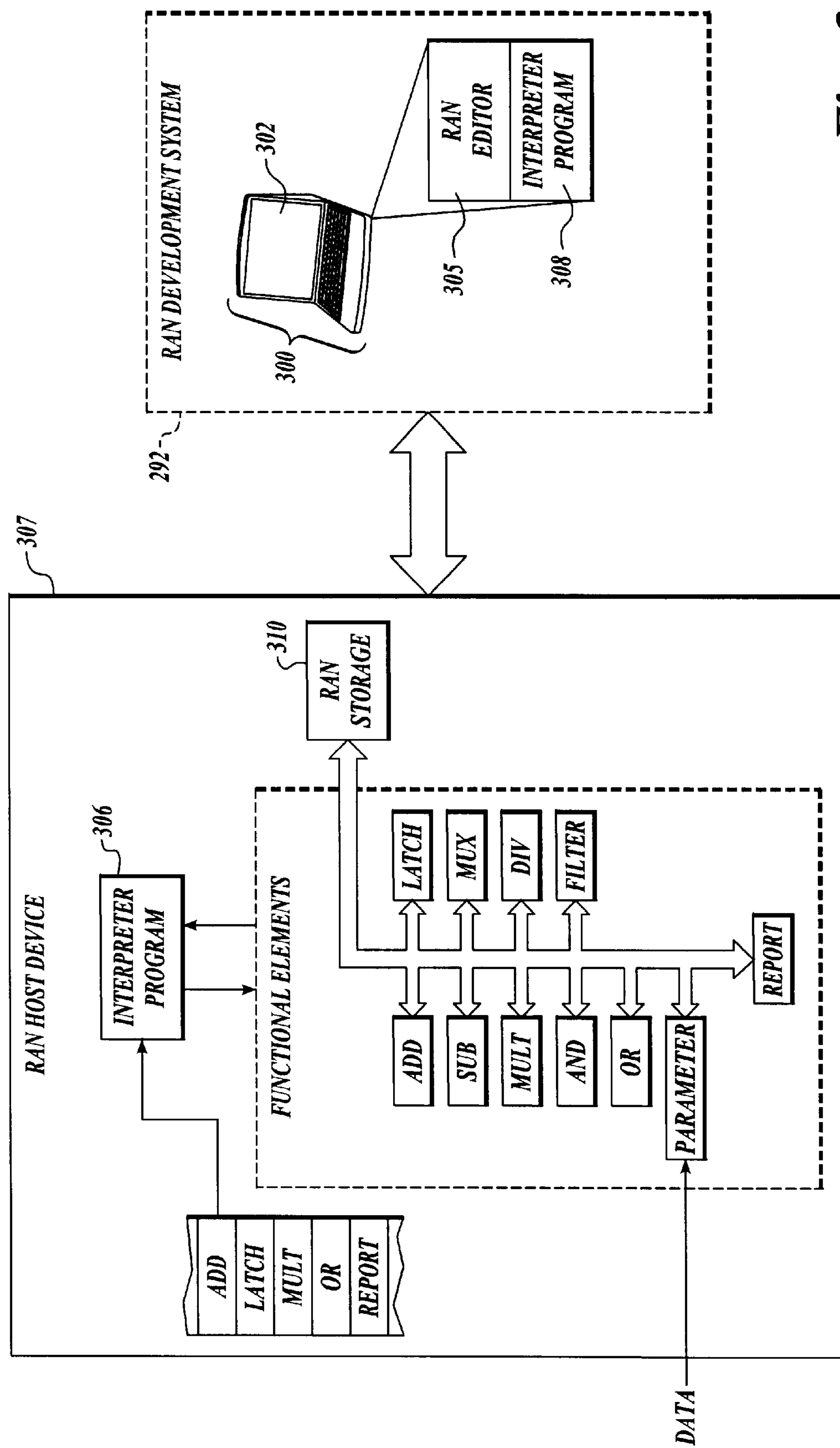
FIG. 3 is a block diagram illustrating implementation of a reconfigurable algorithmic network according to an embodiment of the present invention.

A RAN suitable for use with the present invention is described in U.S. Pat. Ser. No. 5,761,625 titled "Reconfigurable Algorithmic Networks for Aircraft Data Management," which is herein incorporated by reference for all purposes. FIG. 3 shows a conceptual block diagram illustrating design and use of a RAN. In the block diagram of FIG. 3, a development system 292 is used to create the RAN. Development system 292 is hosted on a user interface, or reconfiguration tool, which may be for example, PC 300 having a display screen 302. The user interface may include various input/output devices for receiving data to develop the RAN and for downloading the completed RAN. These input/output devices are well known to those of skill in the art and may include, but are not limited to: PCMCIA cards, floppy discs, USB devices, optical media, and modems. The development system 292 may also include an ACARS unit or other telemetry device to transmit the RAN to the aircraft during flight.

Development system 292 further includes an editor 305 used to develop the RAN(s). In a preferred embodiment of the invention, editor 305, which will be explained in greater detail below, is implemented on a Windows operating system. Editor 305 may include a graphical interface with symbology useful for pictorially representing the logical relationships between data.

After the RAN has been created, the RAN is interpreted in conjunction with the selected flight data by an interpreter program. The interpreter program 306 is resident on that hardware 307 that performs data operations according to the RAN. Host hardware 307 may comprise FDAMS unit 22 which executes the RAN to determine which data to send to flight data recorder 22 and/or ACARS unit 32. An interpreter program 308 can also exist on user interface 300 to process data retrieved from the flight data recorder. Multiple interpreters may therefore exist as desired. One of the advantages of this approach is that the RANs which define the data management operations are hardware independent. Furthermore, this approach substantially reduces certification requirements because once the interpreters are certified as part of the particular hardware, it is not necessary to obtain recertification of the hardware every time the RAN is modified or a new RAN created.

Preferably, all interpreters are the same program written in the same programming language, for example C, and modified only to the extent necessary to run on different types of computer hardware. The interpreter is created using well known interpreter programming techniques such as used in writing Basic interpreters. The interpreter accepts the RAN in the form of a RAN database 310. The RAN database is composed of a series of codes, each code representing a functional element. The functional elements represent various types of operations that may be performed on the flight data. During the interpreting operation, the interpreter, under control of the interpreter program, receives the functional element codes in sequence from the RAN database and selects the computer routines from memory that correspond to the functional elements for execution.

Figure 4:
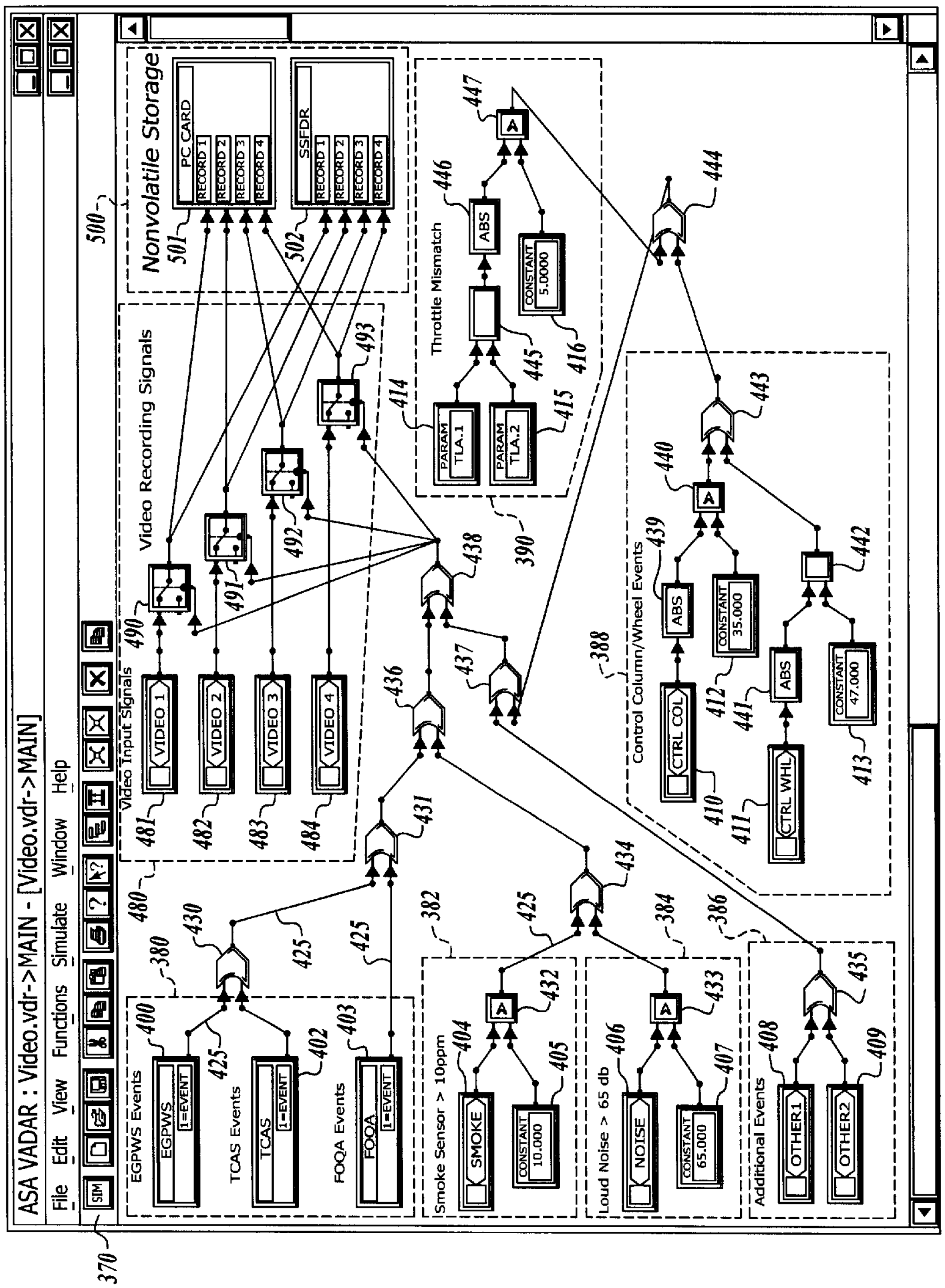
FIG. 4 is a graphical representation of a reconfigurable algorithmic network as displayed on a user interface according to an embodiment of the present invention.

FIG. 4 contains an example RAN as displayed on display 302 of development system 292. The editor screen of FIG. 4 includes a conventional type Windows toolbar 370 for editing and construction of the RAN. The editor screen may optionally include a symbol pallete (not shown in FIG. 4) of commonly used functional element symbols. To create the RAN using the editor screen, the user assembles the functional element symbols representing flight parameters and data and connects them with functional element symbols representing logical operators.

The example RAN of FIG. 4 illustrates some possible combinations of onboard anomalies and events which can be used to initiate recording of video images. FIG. 4 is an illustrative example and the invention is not limited to the scenarios and specific threshold valves depicted therein. In the example of FIG. 4, the logic identifying these triggering events are represented graphically in regions 380–390 of the figure. These events can include the activation of discrete alerts 380, detection of excessive smoke 382, detection of a loud noise 384 or other event 386, control wheel/column anomalies 388, or throttle mismatch 390. Other events 386 may possibly include detection that a switch has been manually activated by the cabin or flight crew signaling that video data should be recorded. Such a switch may prove useful during terrorist or criminal acts or in other unusual circumstances where the crew believes video data to be of benefit.

In the RAN of FIG. 4, a plurality of functional element symbols 400–416 are used to represent the various sensors and/or constant threshold values. For example, in region 380, functional symbol 400 is a graphic symbol that represents the status of the EGPWS system. Functional symbol 400 represents an associated code that asserts a signal when the EGPWS outputs an alert. Functional symbols 401 and 402 represent the occurrence of a TCAS alert or a predefined FOQA event. [1] In region 382, functional symbol 404 represents the output of a smoke sensor and functional element symbol 405 represents a constant having a value of 10 parts per million.

[1]FOQA events are a predefined set of sensor values, normally defined by the aircraft operator, about which the operator wishes to be made aware in order to continuously improve the quality of flight operations. Some typical examples of predefined sensor values may be those that indicate an engine operating anomaly or a combination of values indicative of a tail strike event or conditions indicating such an event was narrowly avoided.

Functional elements 400–416 are connected graphically by lines 425 to functional element symbols 430–447 that represent logical operations. In the example of FIG. 4, functional element 439 represents an absolute value operator and element 443 is an OR gate. Elements 410, 412, 439, 440 and 443 operate to initiate the recording of video data when the absolute value of control column forces exceeds 35 lbs.

Region 480 of FIG. 4 contains functional element symbols 481–484 used to represent the output of four of video cameras 40. Functional elements 481–484 are logically coupled to a plurality of switches 490–491. If any of the logical conditions specified by regions 380–390 of FIG. 4 are satisfied, functional elements 490–491 operate to couple the output of those cameras represented by symbols 481–484 to nonvolatile storage. In the example of FIG. 4, the nonvolatile storage device comprises a PC card and solid state flight data recorder 22 as represented by functional elements 501 and 502 of block 500.

The above is but one example that illustrates how a RAN may be stored and used aboard the aircraft to manage under what conditions video data is to be stored in memory for later retrieval. In another possible embodiment of the invention, the aircraft image data is continuously recorded. Enough storage capacity is provided to record the last 30 minutes of any flight. Such a provision may be practical for certain video channels such as the cockpit video channel and continuous recording need not be provided for all channels. However, in the event that continuous recording is provided, the privacy issues noted above may be addressed by locating the RAN in the downloading or memory reading device. In this embodiment, the reading device would only access the image data stored aboard the aircraft when the criteria as defined by the RAN are satisfied.

In other possible embodiments of the invention, the logic used to define when video data is to be recorded is stored within FDAMS Unit 22 as firm ware or preloaded executable code. Such a system has a disadvantage of not being as readily reconfigurable as use of a RAN type instruction set. However, such a design still proves useful for determining when video data is to be retained and therefore addresses the privacy and storage capacity concerns not solved by prior art video systems.

The invention has now been described. Variations and modifications will be readily apparent to those of skill in the art. For this reason, the invention is to be interpreted in light of the claims.

What is claimed is:

1. A method for recording image data aboard an aircraft comprising the steps of:

providing at least one camera aboard the aircraft for collection of the image data;

placing the image data in a memory buffer;

using a reconfigurable algorithmic network to define a set of predetermined conditions;

determining if at least one of set of predetermined conditions exists during said placing of image data; and writing the image data in said memory buffer to a storage device located aboard the aircraft when said determined conditions exist.

2. The method of claim 1, wherein said step of writing image data includes the step of writing image data to a flight data recorder.

3. The method of claim 1, wherein said step of writing image data includes the step of writing image data to a cockpit voice recorder.

4. The method of claim 1, wherein said step of providing at least one camera includes the steps of providing at least a first camera with an exterior view of the aircraft and a second camera with an interior view of the aircraft.

5. The method of claim 1, wherein said step of writing image data includes the steps of:

receiving a plurality of aircraft sensor data;

determining if said predetermined condition exists by evaluating said sensor data according to a set of executable instructions stored aboard the aircraft; and asserting a signal to write the image data to said storage device when said predetermined condition is determined to exist.

6. The method of claim 5, wherein said step of determining further includes the step of storing said executable instructions in a read only memory device.

7. The method of claim 5, wherein said step of determining further includes the steps of:

loading said executable instructions from a device external to the aircraft to a readable/writable memory device located aboard the aircraft, whereby said executable instructions are reconfigurable.

8. The method of claim 1, wherein said step of writing data to a storage device further includes the step of writing said image data when a switch has been manually activated.

9. The method of claim 1, wherein said step of providing at least one camera comprises the step of providing an infrared camera.

10. A system for recording image data aboard an aircraft comprising:

a crash survivable recorder;

a camera for collecting image data;

a plurality of sensors located aboard the aircraft to collect sensor data;

a reconfigurable algorithmic network; and a device having an input for receiving said sensor data and said image data and said device also having an output, wherein said device causes said image data to be written to said crash survivable recorder when said sensor data indicate the existence of a predetermined condition.

11. The system of claim 10, wherein said camera includes an infrared camera.

12. The system of claim 10, wherein said camera additionally collects audio data.

13. The system of claim 10, wherein said plurality of sensors further include a manually activated switch to indicate the existence of a predetermined condition.

14. The system of claim 10, further comprising a telemetry device for transmitting said image data from the aircraft.

* * * * *